US009402062B2

(12) United States Patent
Hsueh et al.

(10) Patent No.: US 9,402,062 B2
(45) Date of Patent: Jul. 26, 2016

(54) DIGITAL TELEVISION CHIP, SYSTEM AND METHOD THEREOF

(75) Inventors: Kang-Wei Hsueh, Hsinchu (TW); Ya-Lun Yang, Hsinchu County (TW); Hung-Sung Li, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 1944 days.

(21) Appl. No.: 12/118,811

(22) Filed: May 12, 2008

(65) Prior Publication Data

US 2009/0021643 A1    Jan. 22, 2009

Related U.S. Application Data

(60) Provisional application No. 60/950,355, filed on Jul. 18, 2007.

(51) Int. Cl.

| | |
|---|---|
| *H04N 5/14* | (2006.01) |
| *H04N 9/64* | (2006.01) |
| *H03M 1/12* | (2006.01) |
| *G09G 5/00* | (2006.01) |
| *H04N 5/44* | (2011.01) |
| *H04N 5/20* | (2006.01) |
| *H04N 5/21* | (2006.01) |
| *H04N 1/32* | (2006.01) |
| *H04N 5/52* | (2006.01) |
| *H04N 21/426* | (2011.01) |

(52) U.S. Cl.
CPC .............. *H04N 9/642* (2013.01); *G09G 5/008* (2013.01); *H04N 1/32358* (2013.01); *H04N 5/14* (2013.01); *H04N 5/20* (2013.01); *H04N 5/21* (2013.01); *H04N 5/44* (2013.01); *H04N 5/52* (2013.01); *H04N 9/64* (2013.01); *H04N 21/42607* (2013.01)

(58) Field of Classification Search
None
See application file for complete search history.

(56) References Cited

U.S. PATENT DOCUMENTS

| | | | | | |
|---|---|---|---|---|---|
| 4,523,222 | A | * | 6/1985 | Freyberger | ............... H04N 9/64 348/657 |
| 5,438,373 | A | * | 8/1995 | Cummins | ............... G09G 1/285 345/605 |
| 5,818,846 | A | * | 10/1998 | Mori et al. | .................... 370/532 |
| 5,861,864 | A | * | 1/1999 | Jensen | .......................... 715/203 |
| 6,538,656 | B1 | | 3/2003 | Cheung et al. | |

(Continued)

FOREIGN PATENT DOCUMENTS

GB         2 427 778     1/2007

*Primary Examiner* — Jonathan V Lewis
(74) *Attorney, Agent, or Firm* — McClure, Qualey & Rodack, LLP

(57) ABSTRACT

A digital television chip having a reduced layout size is disclosed, comprising a multiplexer, and first and second converting units. The multiplexer, according to a control signal, outputs one of S-video signals SY and SC to the first converting unit, outputs the other of the S-video signals SY and SC to the second converting unit, outputs one of Tuner CVBS signals VIF and SIF to the first converting unit, outputs the other of the Tuner CVBS signals VIF and SIF to the second converting unit, or outputs a CVBS Line-in Video signal to one of the first and second converting units, for reducing the size of the chip. The first converting unit converts one of the S-video signals SY and SC, one of the Tuner CVBS signals VIF and SIF, or the CVBS Line-in Video signal into a first digital signal for signal processing. The second converting unit converts one of the S-video signals SY and SC, one of the Tuner CVBS signals VIF and SIF, or the CVBS Line-in Video signal into a second digital signal for signal processing.

19 Claims, 2 Drawing Sheets

(56) References Cited

U.S. PATENT DOCUMENTS

| | | | |
|---|---|---|---|
| 6,577,348 B1* | 6/2003 | Park | 348/554 |
| 7,126,515 B1* | 10/2006 | Kris | H03M 1/1215 341/141 |
| 7,228,154 B2* | 6/2007 | Champion et al. | 455/557 |
| 7,525,600 B2 | 4/2009 | Kaylani et al. | |
| 7,692,726 B1* | 4/2010 | Greenberg | 348/725 |
| 7,860,398 B2* | 12/2010 | Tatum et al. | 398/141 |
| 8,074,250 B2* | 12/2011 | Hooijmans et al. | 725/131 |
| 8,164,693 B2* | 4/2012 | Yamasaki | H04N 5/14 348/716 |
| 8,269,897 B2* | 9/2012 | Hao et al. | 348/659 |
| 2002/0008780 A1* | 1/2002 | Han, II | G06F 3/14 348/554 |
| 2002/0077177 A1* | 6/2002 | Elliott | 463/40 |
| 2003/0174224 A1* | 9/2003 | Dumont et al. | 348/263 |
| 2003/0206242 A1* | 11/2003 | Choi | 348/441 |
| 2004/0015991 A1* | 1/2004 | Thornton | 725/74 |
| 2004/0217896 A1* | 11/2004 | Cesura et al. | 341/161 |
| 2005/0090213 A1* | 4/2005 | Heng et al. | 455/154.1 |
| 2005/0100102 A1* | 5/2005 | Gazdzinski et al. | 375/242 |
| 2005/0105005 A1* | 5/2005 | Wu et al. | 348/706 |
| 2005/0212977 A1* | 9/2005 | Zhu et al. | 348/725 |
| 2005/0243208 A1 | 11/2005 | Huang | |
| 2006/0082684 A1* | 4/2006 | Kawaguchi et al. | 348/554 |
| 2007/0001891 A1* | 1/2007 | Mazhar | 341/161 |
| 2007/0024760 A1* | 2/2007 | Okanno | 348/706 |
| 2007/0153132 A1* | 7/2007 | Jong | 348/705 |
| 2007/0206119 A1* | 9/2007 | Matsui et al. | 348/557 |
| 2007/0242160 A1* | 10/2007 | Garg et al. | 348/565 |
| 2008/0022339 A1* | 1/2008 | Montreuil et al. | 725/108 |
| 2008/0055466 A1* | 3/2008 | Garg et al. | 348/452 |
| 2008/0059999 A1* | 3/2008 | Winans et al. | 725/34 |
| 2008/0088742 A1* | 4/2008 | Li et al. | 348/572 |
| 2009/0070559 A1* | 3/2009 | Van Wel | 712/215 |

* cited by examiner

DIGITAL TELEVISION CHIP, SYSTEM AND METHOD THEREOF

CROSS REFERENCE TO RELATED APPLICATIONS

This application claims the benefit of U.S. Provisional Application No. 60/950,355, filed Jul. 18, 2007.

BACKGROUND OF THE INVENTION

1. Field of the Invention

The invention relates to a layout size reduction method, and in particular relates to a digital television chip receiving a plurality of analog signals and sharing one or more converting units to convert the plurality of analog signals into digital signals for reducing the size of the digital television chip.

2. Description of the Related Art

Digital television systems have become more popular given the technological development for high definition quality video images. Meanwhile, the digital television system generally receives different kinds of analog signals, such as a VGA/YPbPr signal, S-video signals SY and SC, Tuner CVBS signals VIF and SIF and a CVBS Line-in Video signal. Thus, users can choose from any one of the previous mentioned analog signals to display images on a digital television system.

BRIEF SUMMARY OF THE INVENTION

A detailed description is given in the following embodiments with reference to the accompanying drawings.

An embodiment of a digital television chip for converting analog signals into digital signals is provided. The digital television receives a VGA/YPbPr signal, a couple of S-video signals SY and SC, a couple of Tuner CVBS signals VIF and SIF and a CVBS Line-in Video signal. The digital television chip comprises a multiplexer, a first converting unit and a second converting unit.

The multiplexer receives the S-video signals SY and SC, the Tuner CVBS signals VIF and SIF and the CVBS Line-in Video signal. Besides, the multiplexer, according to a control signal, outputs one of the S-video signals SY and SC to the first converting unit, outputs the other of the S-video signals SY and SC to the second converting unit, outputs one of the Tuner CVBS signals VIF and SIF to the first converting unit, outputs the other of the Tuner CVBS signals VIF and SIF to the second converting unit, or outputs the CVBS Line-in Video signal to one of the first and second converting units.

The first converting unit converts one of the S-video signals SY and SC, one of the Tuner CVBS signals VIF and SIF, or the CVBS Line-in Video signal into a first digital signal for signal processing. The second converting unit converts unit converting one of the S-video signals SY and SC, one of the Tuner CVBS signals VIF and SIF, or the CVBS Line-in Video signal into a second digital signal for signal processing.

Another embodiment of a digital television system is provided. The digital television system comprises a display for displaying images and a digital television chip for converting analog signals into the digital signals. The digital television chip receives a VGA/YPbPr signal, a couple of S-video signals SY and SC, a couple of Tuner CVBS signals VIF and SIF and a CVBS Line-in Video signal. The digital television chip comprises a multiplexer, a first converting unit and a second converting unit.

The multiplexer receives the S-video signals SY and SC, the Tuner CVBS signals VIF and SIF and the CVBS Line-in Video signal. Besides, the multiplexer, according to a control signal, outputs one of the S-video signals SY and SC to the first converting unit, outputs the other of the S-video signals SY and SC to the second converting unit, outputs one of the Tuner CVBS signals VIF and SIF to the first converting unit, outputs the other of the Tuner CVBS signals VIF and SIF to the second converting unit, or outputs the CVBS Line-in Video signal to one of the first and second converting units.

The first converting unit converts one of the S-video signals SY and SC, one of the Tuner CVBS signals VIF and SIF, or the CVBS Line-in Video signal into a first digital signal for signal processing. The second converting unit converts one of the S-video signals SY and SC, one of the Tuner CVBS signals VIF and SIF, or the CVBS Line-in Video signal into a second digital signal for signal processing.

Another embodiment of a layout size reduction method by sharing converting units for a digital television chip is provided. The method comprises using a multiplexer to receive a couple of S-video signals SY and SC, a couple of Tuner CVBS signals VIF and SIF and a CVBS Line-in Video signal, outputting one of the S-video signals SY and SC, one of the Tuner CVBS signals VIF and SIF, or the CVBS Line-in Video signal to a first converting unit according to a control signal, and outputting the other of the S-video signals SY and SC, the other of the Tuner CVBS signals VIF and SIF, or the CVBS Line-in Video signal to a second converting unit according to the control signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In digital television systems, all CVBS (composite video bound signal) line-in/S-video/tuner CVBS signals are converted into digital signals by analog front ends (AFE) and analog-to-digital converters (ADC). If CVBS line-in/S-video/tuner CVBS signals can share analog front ends (AFE) and analog-to-digital converters, a digital television chip size for digital television systems can be reduced.

In digital television systems, a servo ADC detects a SCART input as a CVBS or RGB signal. The servo ADC also detects a voltage level of a key-pad of a controller. Since the servo ADC is a low speed ADC, the servo ADC can be replaced by other high speed ADCs, such as the ADCs for converting CVBS line-in/S-video/tuner CVBS signals into corresponding digital signals, to detect the SCART input or the RGB signal, during the available time period of the above high speed ADCs. Thus, the chip size for digital television systems can also be reduced a lot. In addition, the servo ADC may also have the following functions to detect whether an input image is 4:3 an image or 16:9 an image, to adjust the tuner frequency, to adjust the panel brightness according to the surrounding environmental brightness, or to detect input signal driving capacity.

For a two-chip solution of digital television systems, VGA/YPbPr signals use a high definition multimedia interface (HDMI) to transmit data. If we only use VGA/YPbPr AFE 133, VGA/YPbPr ADC 123 and the HDMI transmitter 113 of the digital television system 100 to transmit VGA/YPbPr signals, CVBS line-in signal, S video signals or tuner CVBS signals to a digital core chip 102, the size of the digital television chip 101 for digital television systems can be reduced a lot.

Figure 1:
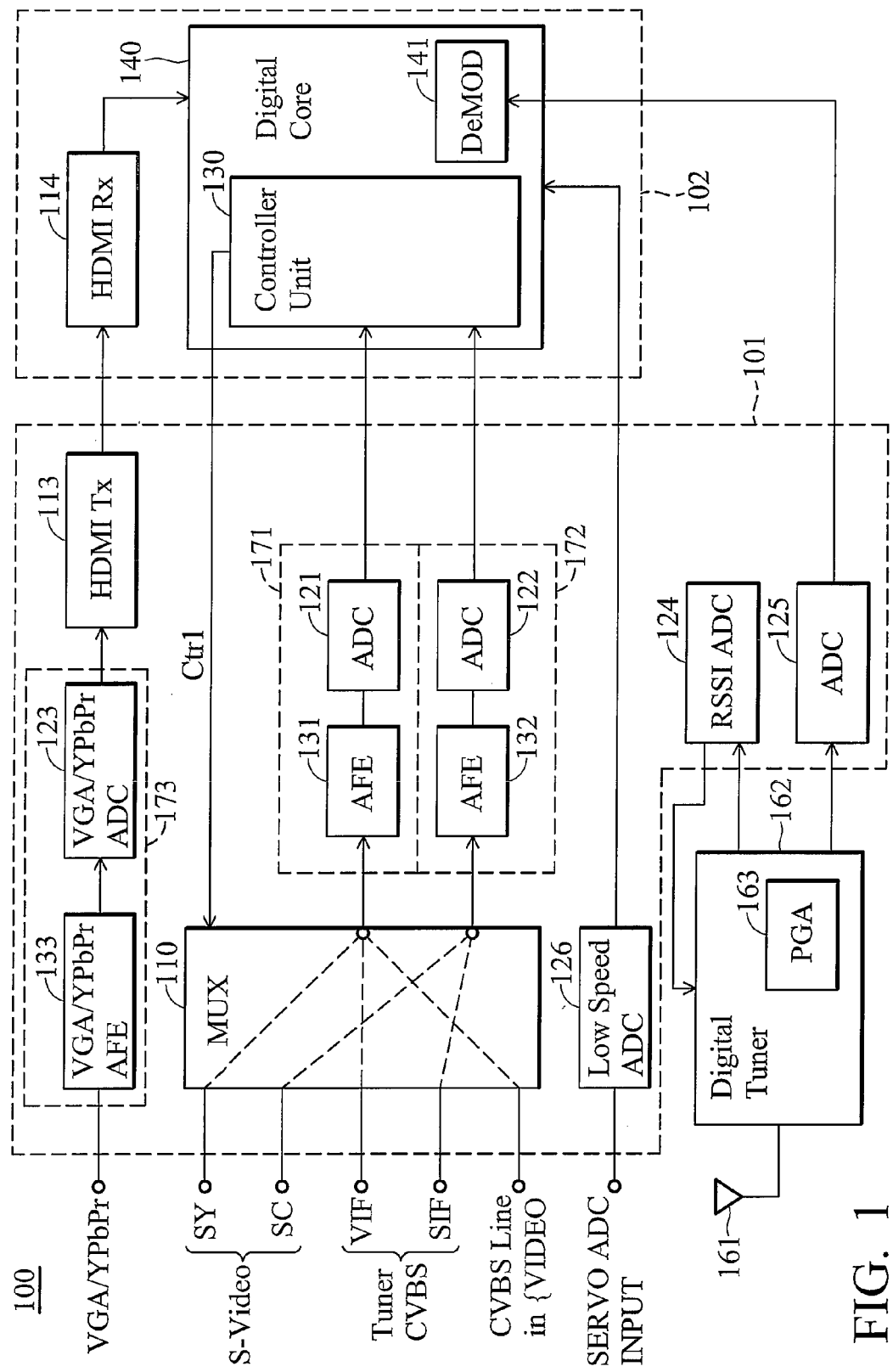
FIG. 1 is a block diagram of two chips of a digital television (DTV) system according to an embodiment of the invention.

FIG. 1 is a block diagram of two chips of a digital television (DTV) system 100 according to an embodiment of the invention. The digital television system 100 comprises a digital television chip 101 for converting analog signals into digital signals and a digital core chip 102 for processing digital signals. The chip 101 comprises AFE units 131, 132 and 133, ADC units 121, 122, 123, 124, 125 and 126, an HDMI transmitter 113, and a multiplexer 110. The chip 102 comprises a digital core 140 and an HDMI receiver 114. The function of the ADC units 121, 122, 123, 124, 125 and 126 may be to convert analog signals into digital signals and the functions of the AFE units 131, 132 and 133 may be to filter analog signals, adjust gains and DC voltage levels of analog signals.

The ADC unit 121 and the AFE unit 131 form a first converting unit 171, The ADC unit 122 and the AFE unit 132 form a second converting unit 172, and the ADC unit 123 and AFE unit 133 form a third converting unit 173. In addition, the ADC unit 123 may be the VGA/YPbPr ADC unit, as shown in FIG. 1.

With regard to the CVBS line-in, signal VIDEO is processed by the AFE unit 131 and the ADC unit 121. With regard to S-video, signal SY is processed by the AFE unit 131 and the ADC unit 121 and signal SC is processed by the AFE unit 132 and the ADC unit 122. With regard to tuner CVBS, signal VIF is processed by the AFE unit 131 and the ADC unit 121 and signal SIF is processed by the AFE unit 132 and the ADC unit 122. However, it is not limited that the first converting unit 171, comprising the AFE unit 131 and the ADC unit 121, converts the signals SY, VIF or VIDEO and the second converting unit 172, comprising the AFE unit 132 and the ADC unit 122, converts the signal signals SC or SIF. The first converting unit 171 also can process the signals SC or SIF and the second converting unit 172 also can process the signals SY, VIF or VIDEO. Any combination makes the signals SY and SC being converted by different converting units and the signals VIF and SIF being converted by different converting units applies. The main point is that CVBS line-in/S-video/tuner CVBS signals can share two AFE units 131 and 132 and two ADC units 121 and 122 to decrease the number of AFE units and ADC units. According to an embodiment of the invention, the ADC units 121 and 122 use a 27 MHz reference clock and the ADC unit 123 uses a 170 MHz reference clock.

The multiplexer 110 can select one of the following signals SY, VIF or VIDEO to output to the AFE unit 131 and the ADC unit 121 to convert into corresponding digital signals and select one of the following signals SC or SIF to output to the AFE unit 132 and the ADC unit 122 to convert into corresponding digital signals according to control signal Ctr1, as shown in FIG. 1. Thus, the size of chip 101 can be reduced. The ADC units 121 and 122 output digital signals to the controller unit 130. The controller unit 130 uses a control signal Ctr1 to control the multiplexer 110 to select one of the following signals SY, VIF or VIDEO and one of the following signals SC or SIF. Signal VGA/YPbPr is processed through the AFE unit 133, the ADC unit 123, the HDMI receiver 113 and the HDMI transmitter 114 to the digital core 140. Signal SERVO ADC INPUT is converted by a low speed ADC (servo ADC) 126 into a corresponding digital signal to be output to the digital core 140. An antenna 161 receives RF signals to output to the digital tuner 162. The digital tuner 162 comprises a PGA (programmable gain amplifier) 163. The RSSI ADC 124 receives the analog signals from the digital tuner 162 and converts the analog signals into digital signals to output back to the digital tuner 162 for adjusting gains by the PGA 163. The ADC 125 receives the analog signals from digital tuner 162 and converts into digital signals to output to the demodulation unit (DeMOD) 141 of the digital core 140.

In another embodiment of the invention, the digital television system 100 does not require the ADC unit 124. During free time periods (available time period) of the ADC 126, the low speed ADC 126 replaces the RSSI ADC 124 to convert the analog signals from the digital tuner 162 into digital signals for reducing the size of the chip.

In another embodiment of the invention, the digital television system 100 does not require the ADC units 124 and 126. During free time periods (available time period) of the ADC unit 122 or 123, the ADC unit 122 or 123 replaces both of the ADC units 124 and 126 to convert analog signals into digital signals for reducing the size of the chip.

In another embodiment of the invention, since the servo ADC 126 is a low speed ADC, the servo ADC 126 can be replaced by CVBS ADC 121, CVBS ADC 122, or VGA/YPbPr ADC 123 during free time periods (available time period).

Figure 2:
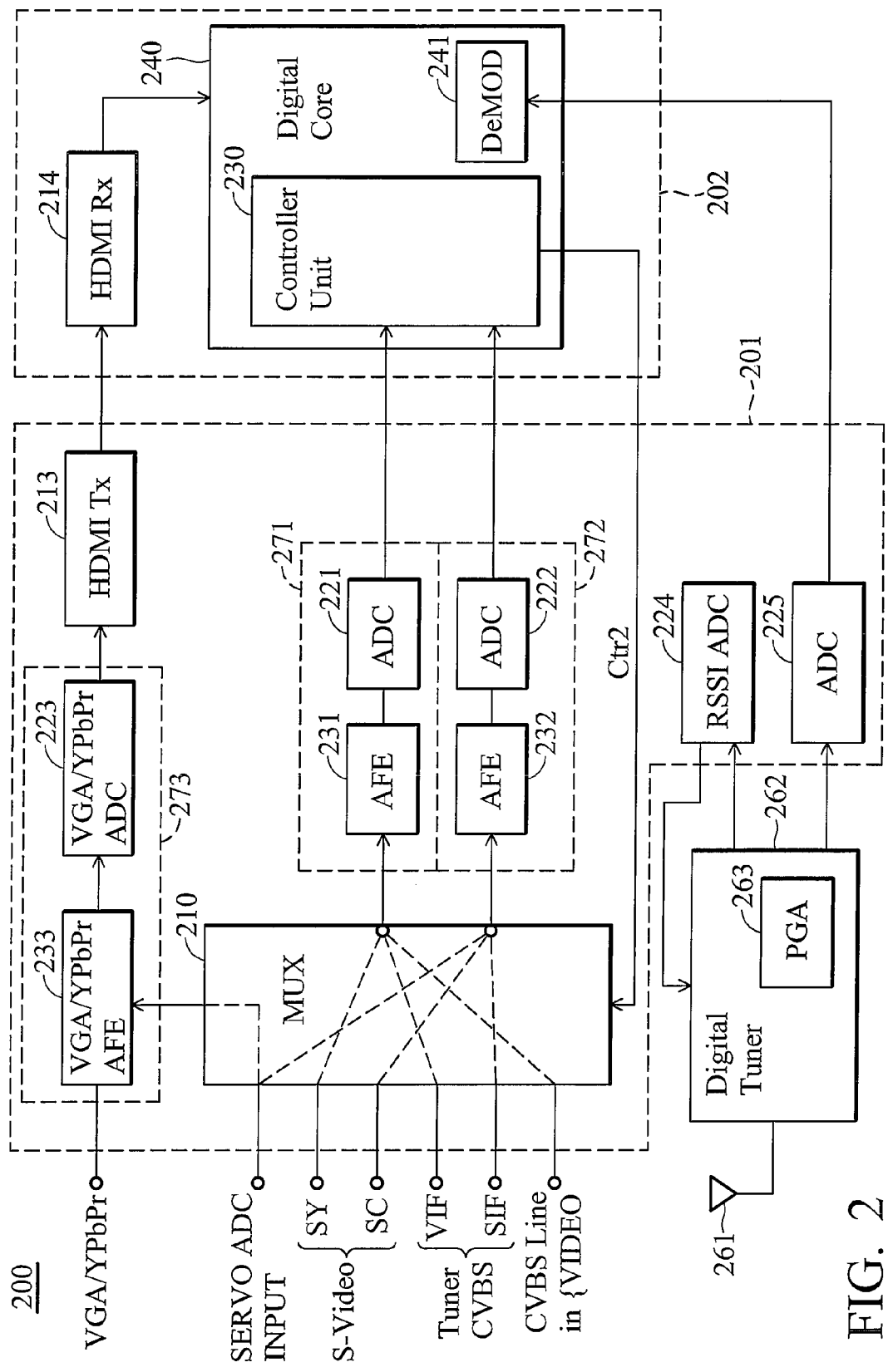
FIG. 2 is a block diagram of two chips of a digital television (DTV) system according to another embodiment of the invention.

FIG. 2 is a block diagram of two chips of a digital television (DTV) system 200 according to another embodiment of the invention. The digital television system 200 comprises a digital television chip 201 for converting analog signals into digital signals and a digital core chip 202 for processing digital signals. The chip 201 comprises AFE units 231, 232 and 233, ADC units 221, 222, 223, 224 and 225, an HDMI transmitter 213, and a multiplexer 210. The chip 202 comprises a digital core 240 and an HDMI receiver 214. The function of the ADC units 221, 222, 223, 224 and 225 may be to convert analog signals into digital signals and the functions of AFE units 231, 232 and 233 may be to filter analog signals, adjust gains and DC voltage levels of analog signals. The ADC unit 221 and the AFE unit 231 form a first converting unit 271, the ADC unit 222 and the AFE unit 232 form a second converting unit 272, and the ADC unit 223 and the AFE unit 233 form a third converting unit 273. In addition, the ADC unit 223 may be the VGA/YPbPr ADC unit, as shown in FIG. 2.

With regard to CVBS line-in, signal VIDEO is processed by a first converting unit 271 (AFE unit 231 and ADC unit 221). With regard to S-video, signal SY is processed by the first converting unit 271 (AFE unit 231 and ADC unit 221) and signal SC is processed by a second converting unit 272 (AFE unit 232 and ADC unit 222). With regard to tuner CVBS, signal VIF is processed by the first converting unit 271 (AFE unit 231 and ADC unit 221) and signal SIF is processed by the second converting unit 272 (AFE unit 232 and ADC unit 222). Signal SERVO ADC INPUT is processed by a third converting unit 273 or the second converting unit 272 to be output to the digital core 240 according to control signal Ctr2, especially during available time periods of the third converting unit 273 or the second converting unit 272. The ADC units 221 and 222 use a 27 MHz reference clock and the ADC 223 uses a 170 MHz reference clock.

The multiplexer 210 can select one of the following signals SY, VIF or VIDEO to output to the AFE unit 231 and the ADC unit 221 and to convert into corresponding digital signals and select one of the following signals SC, SIF or signal SERVO ADC INPUT to output to the AFE unit 232 and ADC unit 222 to convert into corresponding digital signals according to a control signal Ctr2. Thus, the size of the chip 201 can be reduced. ADC units 221 and 222 output digital signals to a controller unit 230. The controller unit 230 uses the control signal Ctr2 to control the multiplexer 210 to select one of the following signals SY, VIF or VIDEO and one of the following signals SC, VIF or SERVO ADC INPUT. Signal VGA/YPbPr is processed through the AFE unit 233, the ADC unit 223, the HDMI transmitter 213 and the HDMI receiver 214 to the digital core 240. An antenna 261 receives RF signals to output to the digital tuner 262. The digital tuner 262 comprises a programmable gain amplifier (PGA) 263. The RSSI ADC 224 receives the analog signals from the digital tuner 262 and converts analog signals into digital signals to output back to the digital tuner 262 for gain adjustment by the programmable gain amplifier 263. The ADC unit 225 receives the analog signals from the digital tuner 262 to output to the demodulation unit 241 of the digital core 240 for demodulation.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital television chip for converting analog signals into digital signals, wherein the digital television chip receives a first group of signals comprising a couple of S-video signals SY and SC, a second group of signals comprising a couple of Tuner CVBS signals VIF and SIF and a third group of signals comprising a CVBS Line-in Video signal, and the digital television chip comprising:
   a multiplexer receiving the first, second and third groups of signals, and selecting and outputting one group from the first, second and third groups of signals according to a control signal;
   a first converting unit converting one of output signals from the multiplexer into a first digital signal for signal processing;
   a second converting unit converting one of output signals from the multiplexer into a second digital signal for signal processing;
   wherein when the selected and output group is the first or second group of signals, one of the output group of signals is output to the first converting unit, the other one of the output group of signals is output to the second converting unit; and when the selected and output group is the third group of signals, the CVBS Line-in Video signal is output to the first converting unit;
   wherein the control signal is sent by a controller unit to control the multiplexer to output one group of the first, second and third groups of signals.

2. The digital television chip as claimed in claim 1, wherein the first converting unit comprises a first AFE unit for filtering signals, adjusting gains or adjusting DC voltage levels and a first ADC unit for converting analog signals into the first digital signal and the second converting unit comprises a second AFE unit for filtering signals, adjusting gains or adjusting DC voltage levels and a second ADC unit for converting analog signals into the second digital signal.

3. The digital television chip as claimed in claim 1, further comprising a third converting unit, wherein the third converting unit receives a VGA/YPbPr signal and converts the VGA/YPbPr signal into a third digital signal to output.

4. The digital television chip as claimed in claim 3, wherein the third converting unit comprises a third AFE for filtering signals, adjusting gains or DC voltage levels and a third ADC unit for converting analog signals into digital signals.

5. The digital television chip as claimed in claim 1, wherein the controller unit is arranged in a digital core chip.

6. The digital television chip as claimed in claim 4, wherein the multiplexer further receives a SERVO ADC INPUT signal, and when the second converting unit is at an available time period, the multiplexer outputs the SERVO ADC INPUT signal to the second converting unit for conversion into digital signals to output or when the third converting unit is at an available time period, the multiplexer outputs the SERVO ADC INPUT signal to the third converting unit for conversion into digital signals to output.

7. A digital television system, comprising:
   a display for displaying images; and
   a digital television chip for converting analog signals into digital signals, wherein the digital television chip receives a first group of signals comprising a couple of S-video signals SY and SC, a second group of signals comprising a couple of Tuner CVBS signals VIF and SIF and a third group of signals comprising a CVBS Line-in Video signal, comprising:
      a multiplexer receiving the first, second and third groups of signals, and selecting and outputting one group from the first, second and third groups of signals according to a control signal;
      a first converting unit converting one of output signals from the multiplexer; and
      a second converting unit converting one of output signals from the multiplexer;
      wherein the control signal is sent by a controller unit to control the multiplexer to output one group of the first, second and third groups of signals;
      wherein when the selected and output group is the first or second group of signals, one of the output group of signals is output to the first converting unit, the other one of the output group of signals is output to the second converting unit; and when the selected and output group is the third group of signals, the CVBS Line-in Video signal is output to the first converting unit.

8. The digital television system as claimed in claim 7, the digital television chip further comprising a third converting unit, wherein the third converting unit receives a VGA/YPbPr signal and converts the VGA/YPbPr signal into a third digital signal to output.

9. The digital television system as claimed in claim 7, wherein the first converting unit comprises a first AFE unit for filtering signal, adjusting gains or adjusting DC voltage levels and a first ADC unit for converting analog signals into the first digital signal and the second converting unit comprises a second AFE unit for filtering signal, adjusting gains or adjusting DC voltage levels and a second ADC unit for converting analog signals into the second digital signal.

10. The digital television system as claimed in claim 8, wherein the third converting unit comprises a third AFE for filtering signal, adjusting gains or adjusting DC voltage levels and a third ADC unit for converting analog signals into digital signals.

11. The digital television system as claimed in claim 7, wherein the controller unit is arranged in a digital core chip.

12. The digital television system as claimed in claim 7, wherein the digital television chip further comprising:
   an fourth ADC unit receiving a analog signal from a digital tuner and converting the analog signal into a fourth digital signal to output back to the digital tuner for adjusting a gain by a programmable gain amplifier in the digital tuner;
   a fifth ADC converting a adjusted analog signal corresponding to the adjusted gain into a fifth digital signal to output.

13. The digital television system as claimed in claim 12, wherein the digital tuner is configured for receiving a signal from an antenna, adjusting its gain by the programmable gain amplifier and the fourth ADC unit, and outputting the adjusting analog signal to the fifth ADC unit.

14. The digital television system as claimed in claim 7, wherein the multiplexer further receives a SERVO ADC INPUT signal, and when the second converting unit is at an available time period, the multiplexer outputs the SERVO ADC INPUT signal to the second converting unit for conversion into digital signals to output or when the third converting unit is at an available time period, the multiplexer outputs the SERVO ADC INPUT signal to the third converting unit for conversion into digital signals to output.

15. A layout size reduction method by sharing converting units for a digital television chip, comprising:
   using a multiplexer to receive a first group of signals comprising a couple of S-video signals SY and SC, a second group of signals comprising a couple of Tuner CVBS signals VIF and SIF and a third group of signals comprising a CVBS Line-in Video signal;
   selecting and outputting one group from the first, second and third groups of signals according to a control signal;
   wherein when the selected and output group is the first or second group of signals, one of the output group of signals is output to a first converting unit, the other one of the output group of signals is output to a second converting unit; and when the selected and output group is the third group of signals, the CVBS Line-in Video signal is output to the first converting unit, and the first converting unit converts one of the S-video signal SY, the Tuner CVBS signal VIF and the CVBS Line-in Video signal into a first digital signal for signal processing, and the second converting unit converts one of the S-video signal SC and the Tuner CVBS signal SIF into a second digital signal for signal processing.

16. The layout size reduction method as claimed in claim 15, wherein the multiplexer is used to switch output of the signals to reduce a number of required converting units to reduce chip size.

17. A digital television chip for converting analog signals into digital signals, wherein the digital television chip receives a first group of signals comprising a couple of S-video signals SY and SC, a second group of signals comprising a couple of Tuner CVBS signals VIE and SIE and a third group of signals comprising a CVBS Line-in Video signal, and the digital television chip comprising:
   a multiplexer receiving the first, second and third groups of signals, and selecting and outputting one group from the first, second and third groups of signals according to a control signal;
   a first converting unit converting one of output signals from the multiplexer into a first digital signal for signal processing;
   a second converting unit converting one of output signals from the multiplexer into a second digital signal for signal processing;
   wherein when the selected and output group is the first or second group of signals, one of the output group of signals is output to the first converting unit, the other one of the output group of signals is output to the second converting unit; and when the selected and output group is the third group of signals, the CVBS Line-in Video signal is output to the first converting unit;
   an fourth ADC unit receiving a analog signal from a digital tuner and converting the analog signal into a fourth digital signal to output back to the digital tuner for adjusting a gain by a programmable gain amplifier in the digital tuner;
   a fifth ADC converting a adjusted analog signal corresponding to the adjusted gain into a fifth digital signal to output.

18. The digital television chip as claimed in claim 17, wherein the digital tuner receives a signal from an antenna, adjusts its gain by the programmable gain amplifier and the fourth ADC unit, and outputs the adjusted analog signal to the fifth ADC unit.

19. The digital television chip as claimed in claim 17, wherein the fifth digital signal is output to a demodulation unit in a digital core chip.

* * * * *